United States Patent [19]

Jacobs

[11] 4,009,983
[45] Mar. 1, 1977

[54] HYDRAULIC MOLD CLAMPING MECHANISM FOR INJECTION MOLDING MACHINE

[76] Inventor: Arthur William Jacobs, 5994 Columbia Road, North Olmsted, Ohio 44070

[22] Filed: Jan. 16, 1976

[21] Appl. No.: 649,592

[52] U.S. Cl. .................. 425/451.2; 425/DIG. 223; 425/451.9; 91/411 R; 425/149
[51] Int. Cl.$^2$ .......................................... B29F 1/06
[58] Field of Search ......... 425/450.1, 451.2, 451.9, 425/DIG. 223, 244, 149, 245; 91/411 R

[56] References Cited

UNITED STATES PATENTS

| | | | |
|---|---|---|---|
| 2,994,107 | 8/1961 | Quinche | 425/451 X |
| 3,084,512 | 4/1963 | Huelskamp | 425/DIG. 223 |
| 3,327,474 | 6/1967 | Schiffer | 425/DIG. 223 |
| 3,456,297 | 7/1969 | Anreasson | 425/451.2 |
| 3,554,087 | 1/1971 | Florjancic | 425/DIG. 223 |
| 3,596,325 | 8/1971 | Hehl | 425/DIG. 223 |
| 3,603,210 | 9/1971 | Florjancic | 425/DIG. 223 |
| 3,613,171 | 10/1971 | Hehl | 425/451.2 |
| 3,770,864 | 11/1973 | Bertrandi | 425/451 X |
| 3,856,454 | 12/1974 | Aoki | 425/451 |

FOREIGN PATENTS OR APPLICATIONS

| | | | |
|---|---|---|---|
| 893,210 | 2/1972 | Canada | 425/451.2 |
| 1,554,881 | 10/1970 | Germany | 425/450.1 |
| 1,554,912 | 10/1970 | Germany | 425/451.2 |
| 7,109,664 | 11/1971 | Japan | 425/451.2 |

Primary Examiner—J. Howard Flint, Jr.
Attorney, Agent, or Firm—Donnelly, Maky, Renner & Otto

[57] ABSTRACT

A mold clamping mechanism for an injection molding machine characterized in that a relatively large mold clamping cylinder has a passage in its piston intercommunicating the head and rod ends of said mold clamping cylinder during stroking of said piston by a relatively small actuating cylinder for flow of oil from said head end into said rod end and into a makeup fluid tank having a capacity corresponding to the displacement of the piston rod of said mold clamping piston and vice versa during the respective mold opening and closing strokes. To effect mold clamping at required tonnage, the mold clamping cylinder has a port through which fluid under high pressure is admitted not only into the mold clamping piston to act on a fluid pressure actuated valve therein to close said passage, but also into the head end of the mold clamping cylinder to pressurize the fluid trapped therein by the closing of said passage.

The mold clamping mechanism herein is further characterized in that an indexable mold supporting platen carries a plurality of mold sections for successive indexing to register with a mold section carried by a movable mold supporting platen and adapted to be clamped by said mold clamping mechanism against a stationary platen.

12 Claims, 4 Drawing Figures

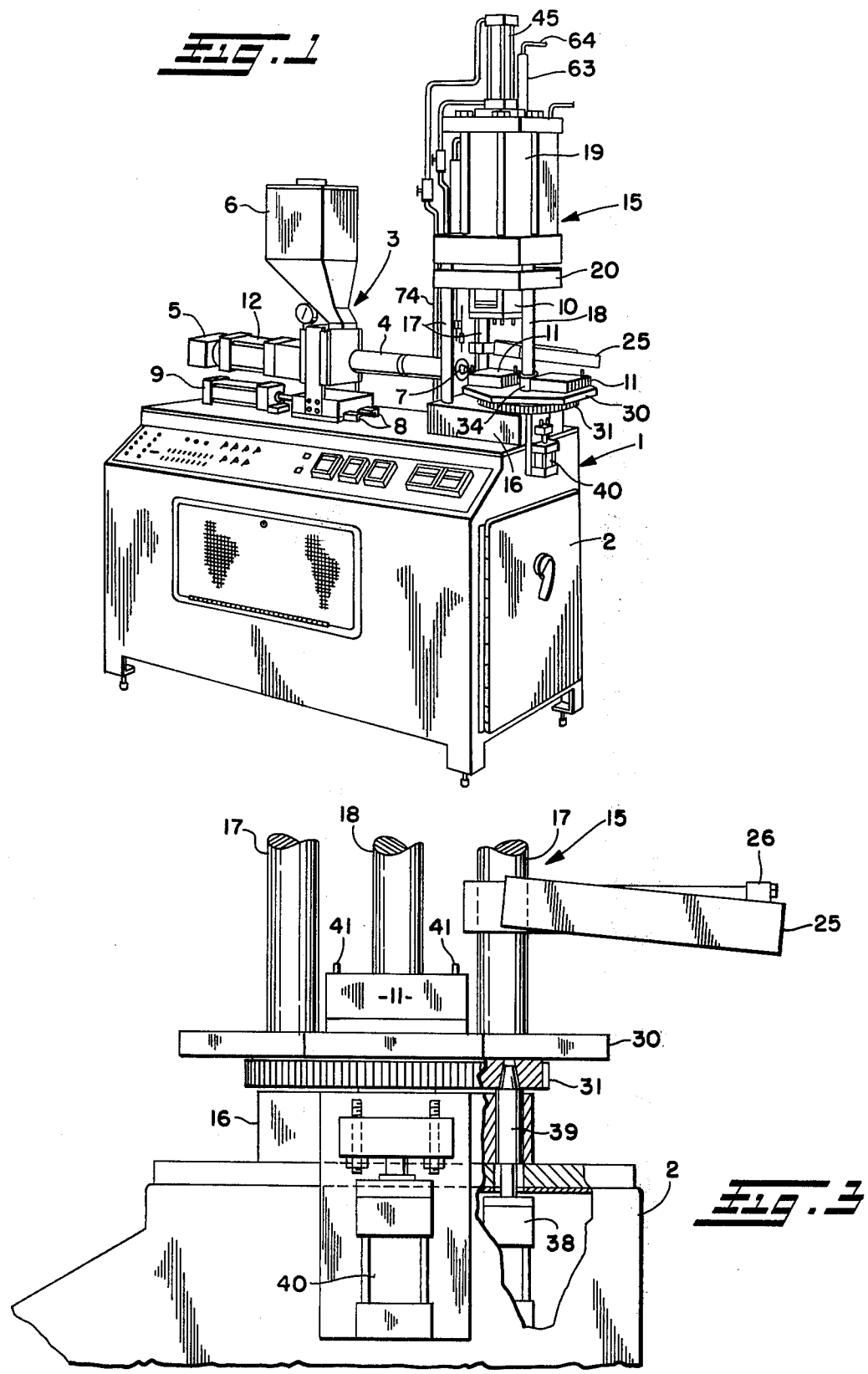

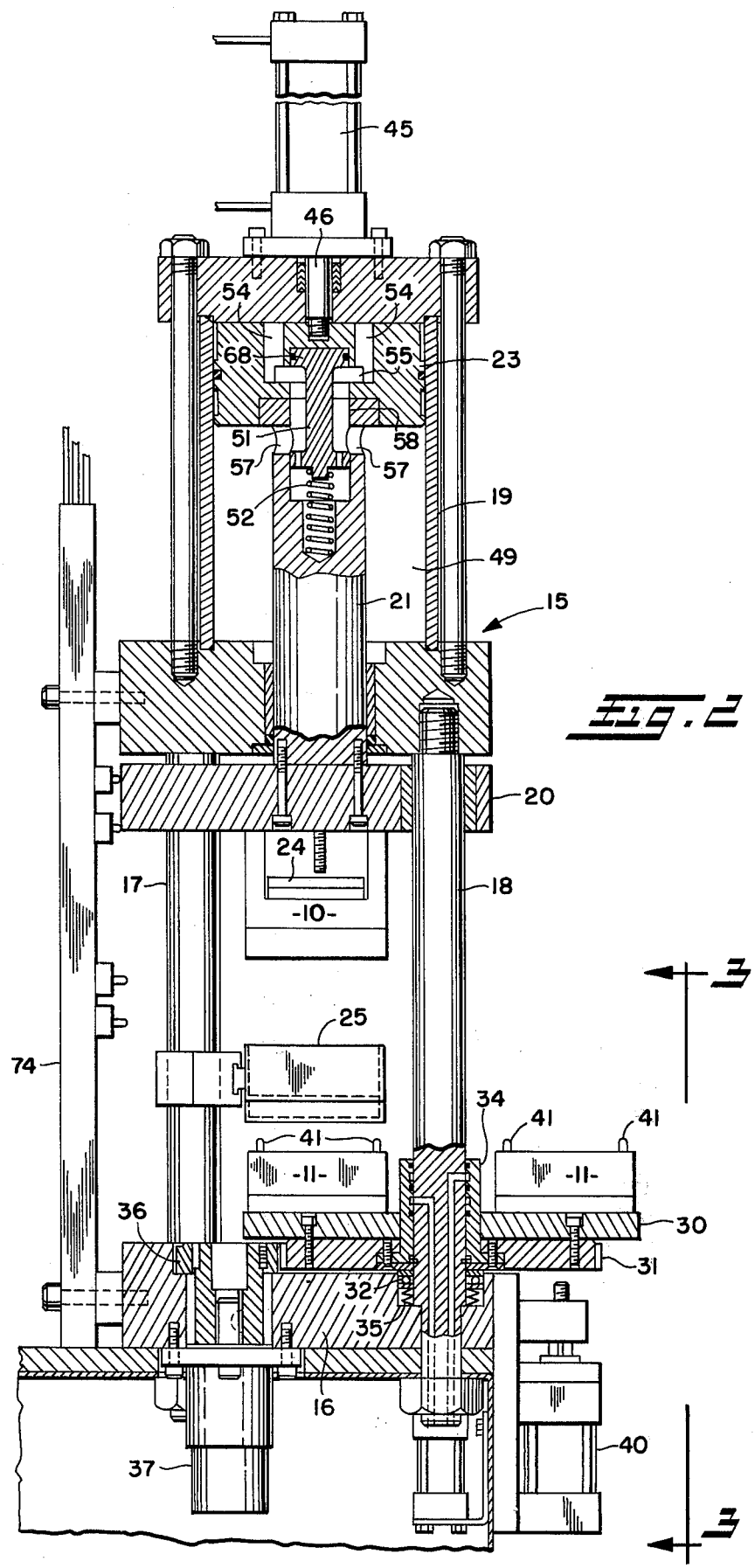

HYDRAULIC MOLD CLAMPING MECHANISM FOR INJECTION MOLDING MACHINE

BACKGROUND OF THE INVENTION

Injection molding machines having straight hydraulic mold clamping systems are known in the art, one known system as disclosed for example in the U.S. Pat. Nos. 3,871,805 and 3,810,728 comprising a mold actuating cylinder having its piston connected to the movable mold supporting platen for moving the latter in mold opening and closing directions, and a clamp pressure booster or intensifying cylinder operative when the mold is closed to increase the fluid pressure in the mold actuating cylinder to lock the mold in closed position with force sufficient to prevent mold flashing upon injection of plasticized material thereinto.

In another known straight hydraulic clamping system such as disclosed in my co-pending application Ser. No. 483,124, filed June 26, 1974, now U.S. Pat. No. 3,941,549 granted Mar. 2, 1976 a large size clamping piston is actuated by a relatively small actuating cylinder, and during the mold closing and opening strokes, fluid flows from the clamping cylinder into a large prefill tank and vice versa, and when the mold is closed a fluid pressure operated prefill valve closes communication between the clamping cylinder and the prefill tank to trap fluid in the clamping cylinder whereby fluid under high pressure conducted into the clamping cylinder exerts the required mold locking tonnage.

In injection molding machines having straight hydraulic clamping systems of the types aforesaid, the movable mold section is clamped against a mold section mounted on a fixed platen and hence such machines do not lend themselves for insert molding in that inserts must be loaded into the mold cavity while the mold is open thereby adding to the machine cycle time.

SUMMARY OF THE INVENTION

In contradistinction to known injection molding machines having straight hydraulic clamping systems, the present injection molding machine obtains required mold locking tonnage by pressurizing trapped fluid in a large clamping cylinder and obtains rapid traverse of the movable mold supporting platen by a relatively small actuating cylinder connected to the mold clamping piston, the clamping piston having a passage which intercommunicates the head and rod ends of the clamping cylinder with oil flowing from the head end into the rod and into a small makeup fluid tank having a capacity corresponding to the displacement of the rod of the clamping piston and vice versa during the mold opening and closing strokes of the clamping piston. The clamping piston is provided with a fluid pressure actuated valve therein which, when the mold is closed, is actuated by fluid pressure admitted into said piston through a port in the clamping cylinder to close the clamping piston passage to thereby trap fluid in the head end which is pressurized by high pressure fluid in said port to exert required mold locking tonnage.

Another object of this invention is to provide a novel arrangement of a fluid pressure operated valve and large size clamping piston passages which when opened by the valve afford free flow of fluid between the head and rod ends of the clamping cylinder with minimum pressure drop, said clamping cylinder having an inlet port for fluid under pressure and said clamping piston having an axially extending tube which forms with the inlet port an annular orifice through which the fluid under pressure is admitted into the head end of the clamping cylinder, said tube providing a passage which leads from the upstream side of said annular orifice into a chamber containing a piston-like portion of the valve to force the valve to a position closing the clamping piston passages for trapping fluid in the head end of the clamping cylinder.

It is another object of this invention to provide an injection molding machine of the character indicated which lends itself to insert molding by providing a plural mold carrying platen adjacent to a fixed platen which is indexable to position successive molds in registry with the movable mold whereby when the movable mold clamps the mold in register therewith against the fixed platen for injection of plastic material, another one (or more) of said plural molds is accessible for insert loading.

Yet another object of this invention is to provide a yieldable plural mold supporting platen which, when the mold is open is freely indexable and which, when the mold is closed, yields and is firmly clamped between the movable mold and the fixed platen.

Other objects and advantages will appear from the ensuing description.

BRIEF DESCRIPTION OF THE DRAWING

FIG. 1 is a perspective view of an injection molding machine embodying the present invention;

FIG. 2 is a vertical cross-section view showing the mold clamping system and the indexable platen carrying successive areas of a plurality of bottom mold sections into and out of registry with the movable top mold section;

FIG. 3 is a partial side elevation view partly in cross section illustrating the indexable platen and a removal tray for molded parts.

DETAILED DESCRIPTION OF A PREFERRED EMBODIMENT

Figure 4:
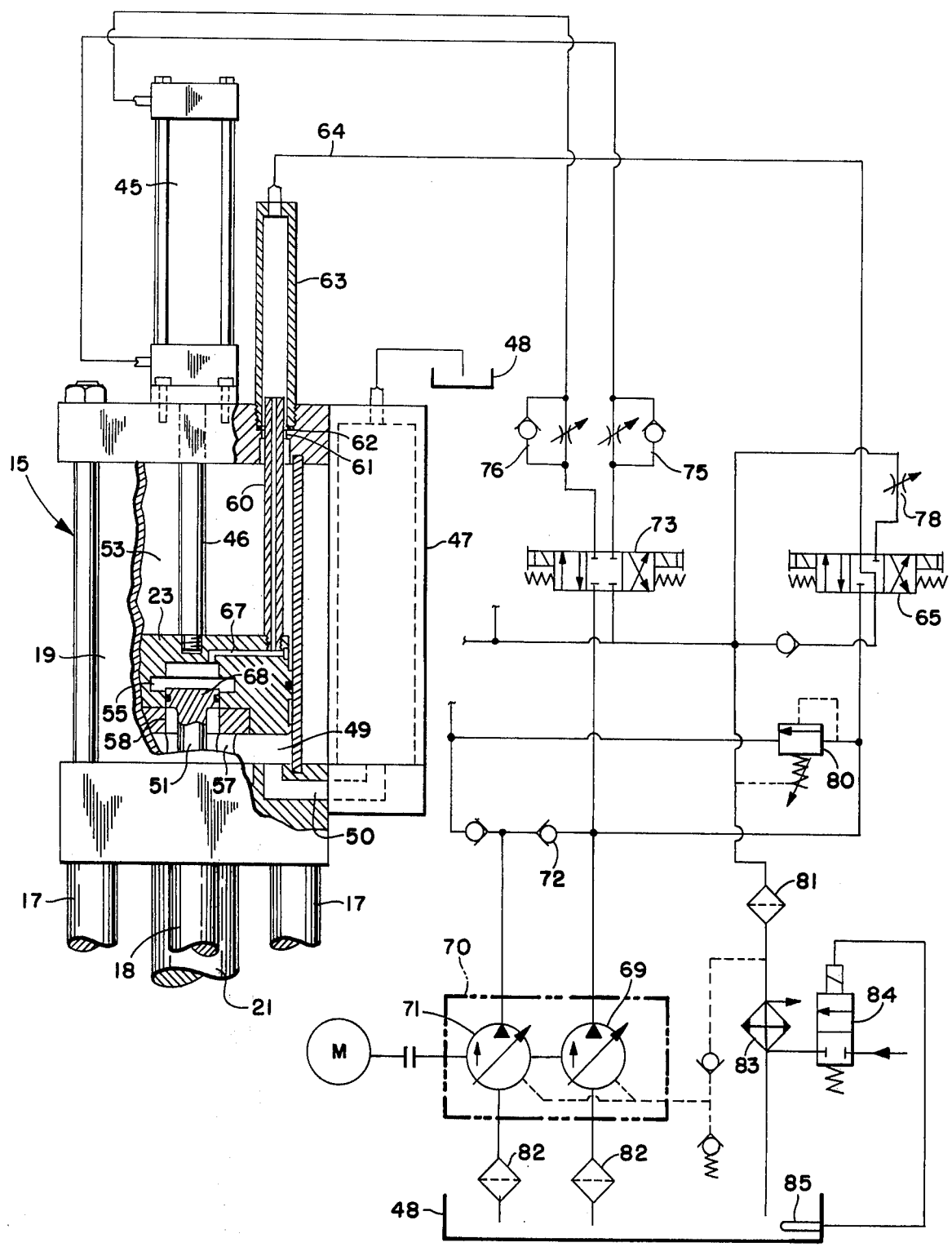
FIG. 4 is a cross-section view taken substantially along the line 4—4, FIG. 2 illustrating the clamping piston in its mold clamping position, said FIG. 4 also schematically illustrating the hydraulic system associated with the mold clamping system herein.

The injection molding machine 1 herein is generally of the type disclosed in U.S. Pat. Nos. 3,810,728 and 3,871,805 and in the co-pending U.S. application Ser. No. 483,124, filed June 26, 1974, and comprises a base structure 2 housing the hydraulic system pump and drive motor and controls for operation of the machine.

At one end of the base structure is an injection assembly 3 which may be of the reciprocating screw type comprising a heated injection cylinder 4 in which a screw (not shown) is rotated by a rotary hydraulic motor 5 to plasticize material supplied from the hopper 6 as the screw rotates and to feed the plasticized material toward the nozzle end 7 of the cylinder 4 as the screw retracts during rotation. Said injection assembly 3 is reciprocably mounted on the base structure 2 by suitable guides 8 and is reciprocated by means of the hydraulic cylinder 9 to bring the nozzle end 7 of the cylinder 4 into and out of engagement with a passage leading into a cavity defined between mating mold sections 10–11.

The nozzle end 7 of the injection cylinder 4 preferably has a pressure actuated valve such as disclosed in the aforesaid U.S. Pat. No. 3,871,805 and upstream of said nozzle valve will be a spreader also as disclosed in said patent. When the nozzle end 7 of the injection cylinder 4 is engaged with the closed mold 10–11, the piston in the cylinder 12 will be actuated to cause the feed screw to move toward the nozzle and 7 to open the pressure actuated valve and to operate as a plunger to inject the plasticized material into the mold cavity at required injection pressure.

The hydraulic system for operating the reciprocating screw injection system 3 may be of the type disclosed in said U.S. Pat. No. 3,941,549 (also the other aforementioned patents) and hence the hydraulic system components of the injection system have been omitted in the FIG. 4 schematic diagram.

Referring now to the straight hydraulic mold clamping system 15, the base structure 2 has thereon a bottom stationary platen 16 having columns 17 and 18 supporting a large mold clamping cylinder 19. Vertically movably guided on said columns 17 and 18 is a top mold section 10 supporting platen 20 which is secured to the lower end of the piston rod 21 of the clamping piston 23 which is reciprocable in the mold clamping cylinder 19.

The top mold section 10 is secured to the movable platen 20 by well-known means and will be provided with the usual ejection plate 24 to eject the molded part onto the tray 25 which is positioned under the top mold section 10 when it is in its upper mold opening position. The tray 25 is preferably actuated by a pneumatic cylinder 26 to rapidly move it to the righthand position as shown in FIG. 3 whereupon the molded part or parts thereon will, by inertia, slide off the end of the tray 25 into a suitable receptacle.

For insert molding, the bottom mold carrying plate 30 is rotatably supported on the column 18 and carries two or more bottom mold sections 11. Fixed under said plate 30 is a gear 31, said plate and gear assembly being rotatably supported by the thrust bearing 32 and sleeve bearing 34. Dished or Belleville type spring washers 35 establish a slight clearance between the gear 31 and the bottom stationary platen 16 so that said plate 30 and gear 31 assembly may be easily indexed for successive indexing of the bottom mold sections 11 into and out of resgistry with the top mold section 10 by means of the drive gear 36 on the rotary hydraulic motor 37. In the present case with two bottom mold sections 11 spaced 180° apart, the indexing movement is 180°, at which time the rotary hydraulic motor 37 is deenergized and the cylinder 38 is energized to move the tapered locking pin 39 into the tapered socket in the gear 31 thus to lock the plate and gear assembly in successive indexed positions.

It is to be understood that more than two bottom mold sections 11 may be mounted on the plate 30 in equally spaced relation so that at each indexed position one of them is lined up with the top mold section 10 and the remaining ones are readily accessible for loading of inserts into the mold cavities thereof. Such loading can be accomplished during the time that the top mold section 10 is in mating engagement with the then aligned bottom mold section 11 and during the injection of plasticized material into the mold cavity defined between the interengaged mold sections 10–11.

The bottom stationary platen 16 may be equipped with a conventional ejection mechanism operated by the cylinder 40 to cause stripping of the molded part from the bottom mold section 11 when the top mold section 10 is moved upwardly so that the molded part will remain in the top mold section 10 until ejected onto the tray 25 which is then positioned between the separated top and bottom mold sections 10 and 11. As to the slight clearance referred to above, it will be evident that when the top mold section 10 approaches the aligned bottom mold section 11, the dowel pins 41 of the bottom mold section 11 will enter dowel holes in the top mold section 10 and the pressure of the top mold section 10 against the bottom mold section 11 will force the plate 30 and gear 31 assembly downward into firm engagement with the bottom stationary platen 16 as permitted by the Belleville spring washers 35 disposed underneath the thrust bearing 32. Likewise, when the top mold section 10 begins to move upwardly the Belleville spring washers 35 will re-establish the clearance aforesaid to facilitate indexing of the plate 30 and gear 31 assembly upon withdrawal of the locking pin 39 and upon energization of the rotary hydraulic motor 37.

Coming now to the hydraulic mold clamping system, the vertical movements of the large clamping piston 23 together with its piston rod 21, top mold supporting platen 20, and top mold 10 is effected by a relatively small hydraulic cylinder 45 secured on the top head end of the clamping cylinder 11 and having the piston rod 46 of the piston therein screwed or otherwise secured to the clamping piston 23. Secured to the clamping cylinder 19 is a fluid makeup tank 47 which may be a length of pipe having a capacity approximately the same as the displacement of the piston rod 21 during the mold closing and closing strokes. The upper end of said makeup tank 47 is open and is communicated with the oil reservoir 48 in the base cabinet 2 and the lower end thereof is communicated with the rod end chamber 49 of the clamping cylinder 19 by way of the large size passage 50.

The clamping piston 23 is provided with a pressure actuated valve member 51 which is biased by the spring 52 to the position shown in FIG. 2 to open communication between the head end rod end chambers 53 and 49 of the clamping cylinder 19 by way of large size passage to minimize pressure drop. By way of example, the piston 23 may be provided with a series of say six large size passages 54 which intersect an undercut 55 and the piston rod 21 may have several large size radial openings through the wall thereof for flow of oil therethrough and through te annular space between the bore 58 and the stem of the valve member 51.

Considering first the rapid traverse opening and closing movements of the top mold section 10, it can be seen that when the piston in the cylinder 45 is actuated downwardly with the valve 51 is open position as shown in FIG. 2, oil from the rod end chamber 49 and makeup tank 47 will freely flow through the aforesaid passages into the enlarging head end chamber 53. Likewise, when the piston in cylinder 45 is actuated upwardly to cause mold opening movement of the clamping piston 23, oil will be displaced from the head end chamber 53 through the aforesaid passages into the rod end chamber 49 and into the makeup tank 47.

Coming now to the mold clamping or locking, the clamping piston 23 has screwed thereinto a vertical length of pipe 60 which is of diameter slightly smaller than the bore 61 through the head end of the clamping cylinder 19 to define an annular orifice. Screwed into the head end of the clamping cylinder 19 and sealed by means of the gasket 62 is another pipe 63 to the upper end of which is connected a hydraulic pressure line 64 which receives fluid under high pressure when the four-way valve 65 is actuated toward the right as viewed in FIG. 4.

The lower end of the pipe 63 communicates with a radial passage 67 in the clamping piston 23 which leads the upper end of the bore 58 in which the piston-like portion 68 of the valve member 51 is disposed in the open condition of the piston passages. When the clamping piston 23 reaches the point where the mold sections 10–11 are brought together, the four-way valve 65 will be actuated by an appropriate limit switch to communicate the high pressure pump 69 with the conduit 64 whereby the pressure build-up in the pipe 63 upstream of the aforesaid annular orifice will be conducted through the pipe 60 to act on the upper end 68 of the valve member 51 to urge the latter downwardly against the spring 52. As the valve member 51 is being moved downwardly oil flowing through the annular orifice will flow through the piston 23 passages and rod end chamber 49 into the makeup tank 47 and, of course, once the makeup tank 47 is filled any excess oil will be returned to the reservoir 48. Once the valve member 51 reaches the position shown in FIG. 4, pressure will build up in the head end chamber 53 through the aforesaid annular orifice to exert high mold clamping force on the clamping piston 23 to lock the mold sections 10–11 in mating engagement to prevent separation thereof when plastic material under high pressure is injected into the mold cavity.

Referring more particularly to the hydraulic system shown in FIG. 4, the pressure source may comprise a dual pump unit 70 driven by the motor M including a low pressure-high volume pump section 71 and a low volume-high pressure pump section 69. For rapid traverse of the clamping piston 23 in mold closing and opening directions, a check valve 72 permits combining of the flows of the pump sections 71 and 69 to the four-way valve 73 for effecting rapid downward and upward movement of the piston in the actuating cylinder 45 according to the position of the four-way valve 73 which may be actuated by appropriate vertically adjustable switches mounted as on a vertical conduit 74 extending upwardly from base structure 2. Suitable variable restrictors 75 and 76 are provided to control the rate of movement of the piston in actuating cylinder 45 in both directions and, as described in the aforesaid patents and application, the four-way valve 65 also constitutes a low pressure closing valve so that the top mold section 10 will, when it reaches a certain distance from the bottom mold section 11, be actuated by low pressure so as to prevent mold damage due to foreign objects therebetween.

When the valve 65 is actuated to the left, the output of the pumps 71 and 69 or pump 69 is divertd to the reservoir 48 via a variable restrictor 78 to effect a pressure drop in cylinder 45 so as not to cause mold damage due to any foreign objects disposed between the mold sections 10–11 during the latter portion of the movement of the top mold section 10.

In FIG. 4, the reference numeral 80 denotes a sequence valve through which high pressure fluid delivered by the pump 69 may be conducted to the injection system 3 to actuate the feed screw as described above and in the aforesaid patents. The reference numerals 81 and 82 denote filters and the reference numeral 83 denotes a heat exchanger through which cooling water is circulated upon energization of the valve 84 by the heat sensitive element 85 in the reservoir 48.

The embodiments of the invention in which an exclusive property or privilege is claimed are defined as follows:

1. A hydraulic mold actuating mechanism for an injection molding machine of the type having an injection assembly operative to inject plasticized material into a cavity defined between a pair of mating mold sections of which one is movable into and out of mating engagement with the other, said mold actuating mechanism being operative to move said one mold section as aforesaid and to clamp said one mold section against the other mold section to resist separation of said mold sections upon injection of plasticized material under pressure into said cavity, said mechanism comprising coaxial tandem relatively small and large piston-cylinder assemblies of which the piston rod of the latter is connected to said one mold section and of which the piston rod of the former is connected to said large piston whereby actuation of said small piston-cylinder assembly in opposite directions imparts movement of said one mold section into and out of mating engagement with said other mold section; said large piston having a passage communicating the rod and head ends of said large cylinder with each other; a makeup fluid tank having fluid communication with the rod end of said large cylinder and having a capacity at least equal to the displacement of the piston rod of said large piston whereby, during movement of said large piston in opposite directions, fluid is conducted through said passage from said rod end and makeup fluid tank into said head end and vice versa according to the direction of movement of said large piston; a fluid pressure actuated valve in said large piston operative when actuated by fluid under pressure to close said passage when said mold sections are in mating engagement; said large cylinder having an inlet port to conduct fluid under pressure into said large piston to actuate said valve as aforesaid and into said large cylinder to pressurize the fluid trapped in the heat end of said large cylinder thereby to firmly hold said mold sections in mating engagement during injection of plasticized material into said cavity; said inlet port comprising an axially extending outer tubular member which is secured to said cylinder head to extend parallel to and alongside the cylinder of said small piston-cylinder assembly and into which fluid under pressure is conducted from its axially outer end, an axially extending inner tubular member which is secured to said large piston to extend into said outer tubular member in all positions of said large piston, said inner tubular member defining with said cylinder head an orifice through which fluid under pressure in said outer tubular member is conducted into said head end and providing a passageway through which fluid under pressure in said tubular member upstream of said orifice is conducted into said large piston to actuate said valve as aforementioned.

2. The mechanism of claim 1 wherein said orifice is constituted by radial clearance between said inner tubular member and a bore in said cylinder head.

3. The mechanism of claim 1 wherein said passage includes a central bore with blind ends in said piston and in the adjoining portion of said piston rod, an annular groove in said piston internally open to said bore, axial openings in said piston communicating said head end with said groove, and radial openings in said piston rod communicating said rod end with said bore; and wherein said valve has a piston-like portion slidable in said bore from a position on one side of said groove for flow of fluid through said passage to a fluid pressure actuated position on the other side of said groove thus to close said passage to trap fluid in said head end.

4. The mechanism of claim 3 wherein spring means in said piston rod biases said valve to said first-mentioned position upon release of fluid pressure acting on said piston-like portion thereof.

5. The mechanism of claim 1 wherein said valve, during actuation thereof, progressively closes said passage whereby additional fluid from said inlet port into said head end displaces fluid from said head end into said rod end and said makeup fluid tank, said tank having an opening to conduct excess fluid to a reservoir thus to progressively replace fluid in said makeup tank and in said large cylinder.

6. A hydraulic mold actuating mechanism for an injection molding machine of the type having an injection assembly operative to inject plasticized material into a cavity defined between a pair of mating mold sections of which one is movable into and out of mating engagement with the other, said mold actuating mechanism being operative to move said one mold section as aforesaid and to clamp said one mold section against the other mold section to resist separation of said mold sections upon injection of plasticized material under pressure into said cavity, said mechanism comprising coaxial tandem relatively small and large piston-cylinder assemblies of which the piston rod of the latter is connected to said one mold section and of which the piston rod of the former is connected to said large piston whereby actuation of said small piston-cylinder assembly in opposite directions imparts movement of said one mold section into and out of mating engagement with said other mold section; said large piston having a passage communicating the rod and head ends of said large cylinder with each other; a makeup fluid tank having fluid communication with the rod end of said large cylinder and having a capacity at least equal to the displacement of the piston rod of said large piston whereby, during movement of said large piston in opposite directions, fluid is conducted through said passage from said rod end and makeup fluid tank into said head end and vice versa according to the direction of movement of said large piston; a fluid pressure actuated valve in said large piston operative when actuated by fluid under pressure to close said passage when said mold sections are in mating engagement; said large cylinder having an inlet port to conduct fluid under pressure into said large piston to actuate said valve as aforesaid and into said large cylinder to pressurize the fluid trapped in the head end of said large cylinder thereby to firmly hold said mold sections in mating engagement during injection of plasticized material into said cavity; said machine having support means for supporting said large piston-cylinder assembly in vertical position above said other mold section whereby said one mold section and the molded article therein is movable upwardly away from said other mold section in response to upward movement of said large piston; and an article removing device laterally movably supported by said support means to and from a position between said mold sections respectively to receive said molded article when ejected from said one mold section and to laterally move said molded article from the space between said mold sections.

7. The mechanism of claim 6 wherein said support means has an indexable carrier for said other mold section and for at least one additional other mold section thereon; said carrier, upon indexing thereof successively positioning said other mold sections into and out of alignment with said one mold section; said other mold sections having provision for insert molding whereby inserts may be loaded into said other mold section during the time that it is in misaligned position.

8. The mechanism of claim 7 wherein said support means includes platen which is disposed beneath said carrier and said other mold section which is then aligned with said one mold section to provide a fixed support for clamping together of said aligned mold sections.

9. The mechanism of claim 8 wherein means for indexing said carrier comprises a rotary hydraulic motor secured to said support means and having a drive gear meshing with a gear on said carrier.

10. The mechanism of claim 9 wherein means for locking said carrier in successive indexed positions comprises a tapered pin upwardly movably carried by said support means into a tapered socket in said carrier.

11. The mechanism of claim 8 wherein said stationary platen has yieldable thrust bearing means supporting said carrier with slight clearance with said stationary platen to facilitate indexing of said carrier; said aligned mold sections, when clamped together, causing yielding of said thrust bearing means for firm clamping of said carrier against said stationary platen.

12. A mold clamping mechanism comprising a hydraulic mold clamping cylinder having a piston reciprocable therein and having a passage intercommunicating the head and rod ends of said cylinder; a fluid makeup tank having fluid communication with said rod end and having a capacity at least equal to the displacement of said piston rod; an actuating cylinder having one end secured coaxially to said mold clamping cylinder and having its piston rod secured to said piston for reciprocating said piston in mold opening and closing directions; a fluid pressure actuated valve coaxially within said piston operative to close said passage when said piston is in mold closing position; said cylinder having an inlet port through which fluid under pressure is conducted into said piston to actuate said valve to passage closing position to trap fluid in said head end and to admit fluid under pressure into said head end to pressurize the fluid therein to exert firm clamping force on the closed mold; said inlet port comprising an eccentrically disposed axial opening in said cylinder head to which an axially extending outer tubular member is secured parallel to and alongside said actuating cylinder, an axially extending inner tubular member secured to said piston to extend loosely into said outer tubular member in mold closing and opening positions of said piston; said inner tubular member having a passageway communicating the interior of said outer tubular member with said valve and defining with said opening an annular orifice communicating the interior of said outer tubular member with said head end whereby fluid under pressure admitted into said outer tubular member upstream of said orifice is conducted to said valve via said passageway and into said head end via said orifice.

* * * * *